(12) United States Patent
    Tatsumi

(10) Patent No.: US 8,255,730 B2
(45) Date of Patent: Aug. 28, 2012

(54) POWER MANAGEMENT UNIT AND SYSTEMS LSI HAVING THE POWER MANAGEMENT UNIT

(75) Inventor: Masahiro Tatsumi, Kawasaki (JP)

(73) Assignee: Fujitsu Semiconductor Limited, Yokohama (JP)

(*) Notice: Subject to any disclaimer, the term of this patent is extended or adjusted under 35 U.S.C. 154(b) by 785 days.

(21) Appl. No.: 12/277,763

(22) Filed: Nov. 25, 2008

(65) Prior Publication Data
    US 2009/0144578 A1    Jun. 4, 2009

(30) Foreign Application Priority Data

Nov. 30, 2007    (JP) .................................. 2007-310950

(51) Int. Cl.
    *G06F 1/00*    (2006.01)
(52) U.S. Cl. .......................................... 713/340
(58) Field of Classification Search .................... 713/340
    See application file for complete search history.

(56) References Cited

FOREIGN PATENT DOCUMENTS

JP            07-325647 A          12/1995

OTHER PUBLICATIONS

ISSCC 2007 Report "Complete Projectiion of IBM Next-Generation Processor Power6" http://pc.watch.impress.co.jp/docs/2007/0215/isscc04.htm.

*Primary Examiner* — Paul R Myers
*Assistant Examiner* — Jeremy S Cerullo
(74) *Attorney, Agent, or Firm* — Arent Fox LLP

(57) ABSTRACT

A power management unit for controlling power supply voltages of first and second power domains to which first and second CPUs belong respectively includes a power IC which supplies first and second power supply voltages to the first and second power domains respectively; a clock generating portion which generates first and second clocks and supplies the first and second clocks to the first and second CPUs respectively; and a power and clock control portion which is connected both to the power IC and to the clock generating portion.

12 Claims, 11 Drawing Sheets

POWER MANAGEMENT UNIT AND SYSTEMS LSI HAVING THE POWER MANAGEMENT UNIT

CROSS-REFERENCE TO RELATED APPLICATIONS

This application is based upon and claims the benefit of priority from the prior Japanese Patent Application No. 2007-310950 filed on Nov. 30, 2007, the entire contents of which are incorporated herein by reference.

BACKGROUND

1. Field

The present invention relates to a power management unit and a system LSI having the power management unit.

2. Description of Related Art

A next-generation LSI has CPU cores (hereinafter simply referred to as CPUs) and logic circuit blocks, each of which belong to different power domains. Separation of the inside of the LSI into power domains makes it possible to reduce the influence of power noise caused by the operating state of a CPU or logic circuit block belonging to one power domain on a CPU or logic circuit block belonging to another power domain.

Recently, reduction of electric power consumption has become an important issue for the next-generation LSI.

In Japanese Patent Laid-Open No. JP-A-7-325647 and ISSCC 2007 Report "Complete Projection of IBM Next-Generation Processor POWER6", a system of controlling power supply voltages of different power domains independently while controlling clock frequencies independently in accordance with operating states of CPUs or logic circuit blocks belonging to the different power domains is described.

Particularly when a CPU is made to execute a specific process or when a specific logic circuit block is to be operated, the required operating clock frequency and power supply voltage can be estimated in advance. Therefore, when the power supply voltage of the CPU or logic circuit block which will execute the specific process is increased to a required level before the start of execution of the specific process and then the operating clock frequency is increased to a required level, electric power consumption during inexecution of the specific process can be reduced.

As described above, the next-generation LSI has an internal or external power management unit that controls power supply voltages and operating clock frequencies of power domains independently to reduce electric power consumption for the entire LSI.

SUMMARY

According to an aspect of the invention, there is provided a power management unit for controlling power supply voltages of first and second power domains to which first and second CPUs belong respectively. The power management unit includes a power IC which supplies first and second power supply voltages to the first and second power domains respectively, a clock generating portion which generates first and second clocks and supplies the first and second clocks to the first and second CPUs respectively, and a power and clock control portion which is connected both to the power IC and to the clock generating portion. The power and clock control portion controls the power IC to change the second power supply voltage in response to a power supply voltage change request for the second power domain from the first CPU and controls the clock generating portion to change the frequency of the second clock in response to a frequency change request for the second clock from the second CPU. The power and clock control portion prohibits acceptance of the second clock frequency change request in response to the second power domain power supply voltage change request unless the second power supply voltage reaches a requested voltage.

According to another aspect of the invention, there is provided a system LSI supplied with power supply voltages from a power IC and supplied with clocks from a clock generating portion. The system LSI includes first and second CPUs which belong to first and second power domains respectively, and a power management unit which controls first and second power supply voltages of the first and second power domains. The power management unit controls the power IC to change the second power supply voltage in response to a power supply voltage change request of the second power domain from the first CPU and controls the clock generating portion to change the frequency of a second clock in response to a second clock frequency change request from the second CPU. The power management unit further prohibits acceptance of the second clock frequency change request in response to the power supply voltage change request of the second power domain during a period required for the second power supply voltage reaching a requested voltage.

DESCRIPTION OF THE PREFERRED EMBODIMENTS

Embodiments will be described below with reference to the drawings. Also, the technical scope of the invention is not limited to these embodiments but can cover items described in the scope of claims and their equivalents.

Figure 1:
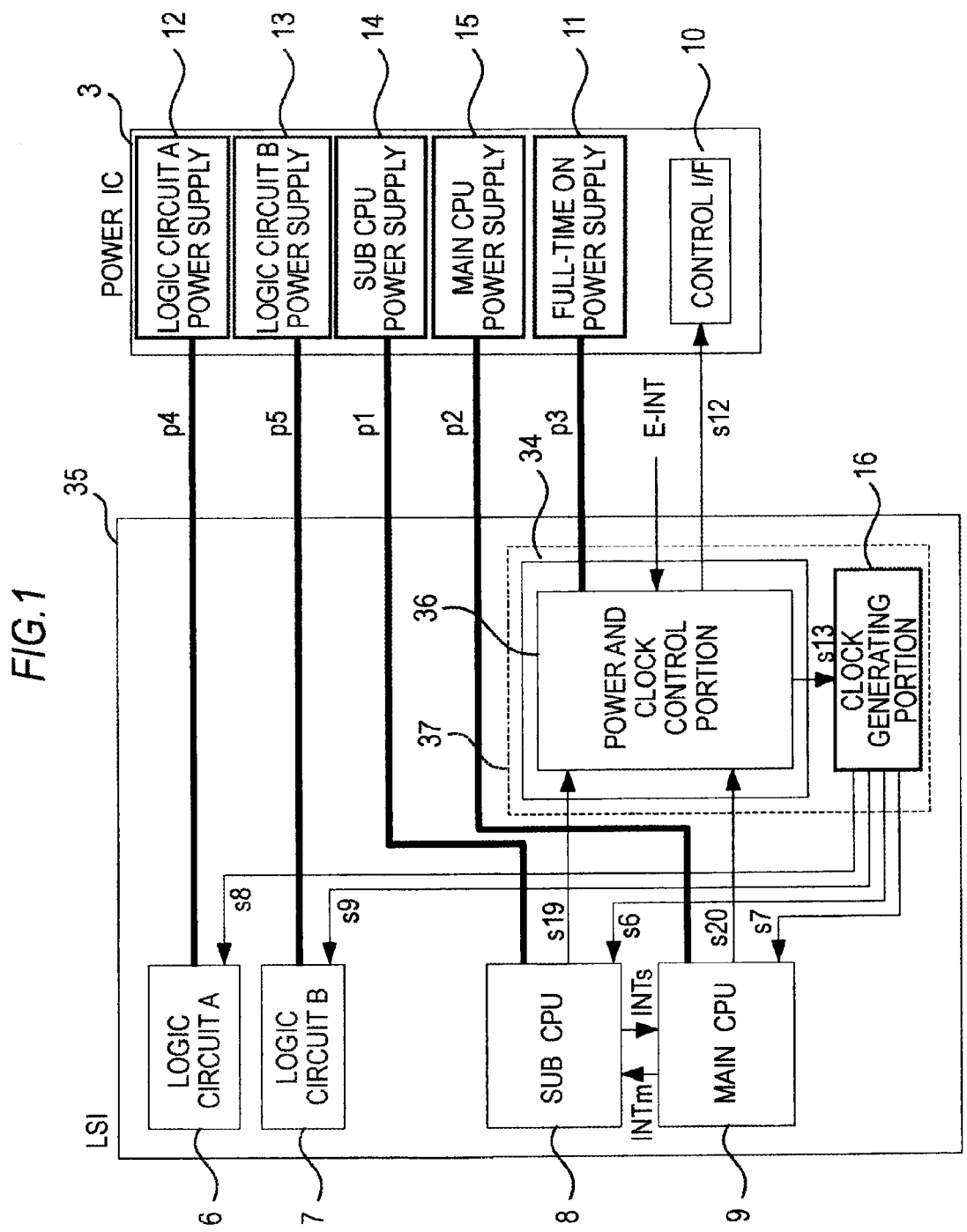
FIG. 1 is a configuration diagram of a system LSI having a plurality of CPUs.

FIG. 1 is a configuration diagram of a system LSI having a plurality of CPUs. The system LSI 35 has a main CPU 9, a sub CPU 8, and logic circuits 6 and 7. The main CPU 9, the sub CPU 8, and the logic circuits 6 and 7 belong to different power domains respectively. The LSI 35 further has a full-time ON power domain 37 that is always supplied with power. A power management unit (PMU) 34 and a clock generating portion 16 belong to the power domain 37. The power management unit 34 has a power and clock control portion 36 which controls the ON/OFF and the rise/drop f the power supply voltages p1 to p4 of the power domains generated by an external power supply and which controls clock frequencies s6 to s9 of the CPUs 9 and 8 and the logic circuits 6 and 7.

A power IC 3 has power supply portions 11, 12, 13, 14, and 15, and a control interface 10 which receives a control request from the power and clock control portion 36 and controls ON/OFF and rise/drop of power supply voltages of the power supply portions 11, 12, 13, 14, and 15. The full-time ON power supply portion 11, the logic circuit A power supply portion 12, the logic circuit B power supply portion 13, the sub CPU power supply portion 14, and the main CPU power supply portion 15 are voltage regulator circuits which generate power supply voltages p3, p4, p5, p1, and p2 respectively. These power supply portions 11, 12, 13, 14, and 15 supply power supply voltages p3, p4, p5, p1, and p2 corresponding to the power domains 37, 6, 7, 8, and 9 respectively. However, the full-time ON power supply portion 11 supplies the power supply voltage p3 to the full-time ON power domain 37 so that the power supply voltage p3 is kept ON all the time.

As described above, the inside of the system LSI 35 is separated into the power domains 37, 6, 7, 8, and 9 while the power supply portions 11, 12, 13, 14, and 15 are provided for supplying power supply voltages p3, p4, p5, p1, and p2 to the power domains respectively. Accordingly, the power supply voltages of the power domains can be switched ON/OFF and rise/drop independently to achieve power supply optimized in accordance with internal processing of the LSI 35 and to make power saving possible.

The power and clock control portion 36 in the power management unit 34 supplies a power control signal s12 to the power IC 3 to instruct the power IC 3 to control power supply voltages in response to an interrupt signal E-INT from an external device or in response to a control request s19 or s20 from CPU 8 or 9. The power and clock control portion 36 in the power management unit 34 further supplies a clock control signal s13 to the clock generating portion 16 to instruct the clock generating portion 16 to control ON/OFF of clocks and rise/drop of clock frequencies. The control interface 10 controls the power supply portions 11 to 15 in response to the power control signal s12. The clock generating portion 16 controls ON/OFF and frequency rise/drop of the clocks s6, s7, s8, and s9 in response to the clock control signal s13.

Figure 2:
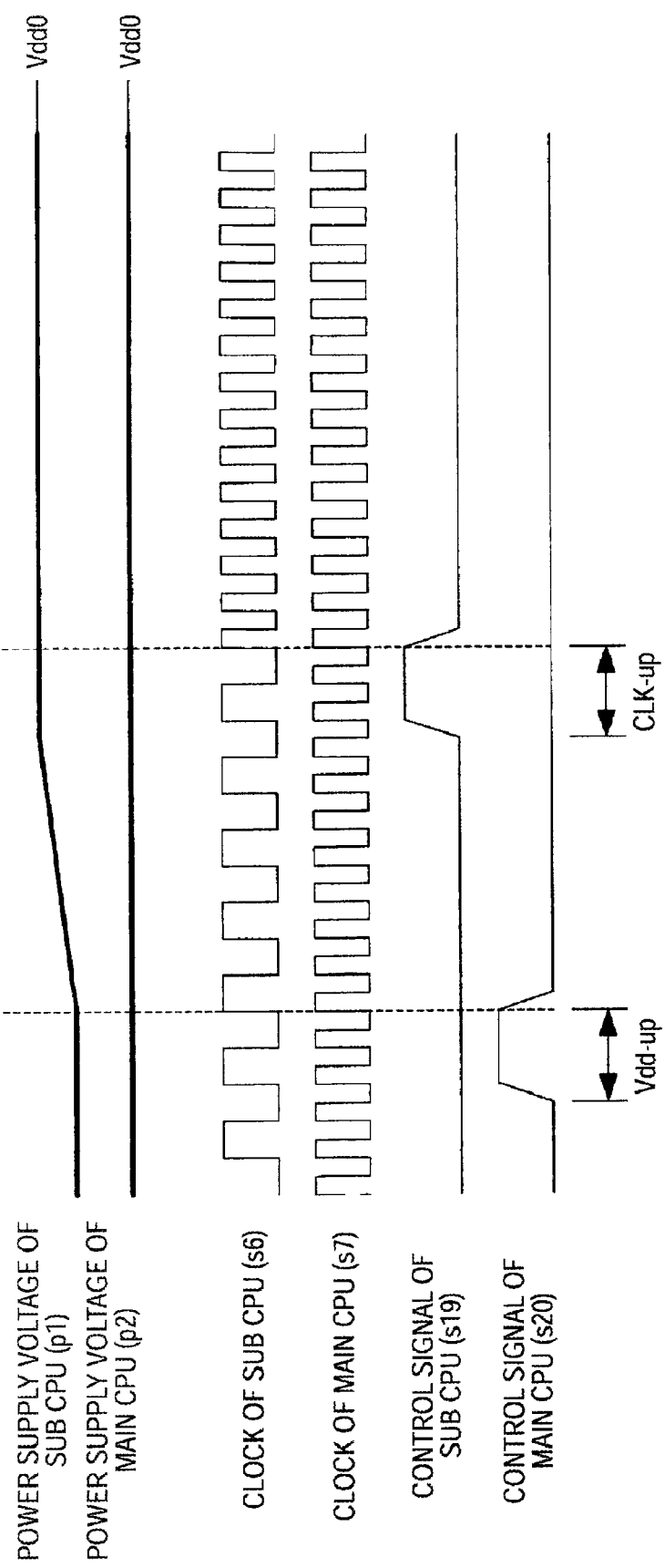
FIG. 2 is a waveform chart showing a power control sequence in the system LSI shown in FIG. 1.

FIG. 2 is a waveform chart showing a power control sequence in the system LSI shown in FIG. 1. The system LSI shown in FIG. 1 has power domains that are separated and the power supply voltages of the power domains are controlled independently. Clock frequencies of the CPUs 8 and 9 and the logic circuits 6 and 7 belonging to the power domains are also controlled independently. For example, in a first operating mode, the main CPU 9 performs a given process and the sub CPU 8 stands by. Assume now a case where the operating mode is shifted to a second operating mode in response to an occurrence of a certain event so that the main CPU 9 makes the sub CPU execute a specific process.

In this case, the power supply voltage p2 of the power domain to which the main CPU 9 belongs is controlled to be a high voltage Vdd0, and the clock frequency s7 of the main CPU is controlled to be a high frequency. In a standby state, the power supply voltage p1 of the sub CPU 8 is controlled to be a low voltage, and the clock frequency s7 of the sub CPU is controlled to be a low frequency. Therefore, the main CPU 9 issues an interrupt signal INTm to the sub CPU 8 and issues a control signal (Vdd-up) s20 to the power and clock control portion 36 to increase the power supply voltage p1. The power and clock control portion 36 issues a power control signal s12 in response to the control signal s20 to increase the power supply voltage p1 of the sub CPU power supply portion 14 in the power IC 3. Since the power supply portion 14 is a voltage regulator, which is a circuit for increasing a power supply voltage by a pumping operation, a certain amount of time is required for increasing the power supply voltage.

Then, after passage of a specified time required for increasing the power supply voltage p1 to the assured voltage Vdd0, which is the voltage after the requested change, the sub CPU 8 issues a control signal (CLK-up) s19 to increase the frequency of the clock signal s6. The power and clock control portion 36 issues a clock control signal s13 in response to the control signal s19 to increase the frequency of the clock signal s6 in the clock generating portion 16. A normal power control sequence has been described above.

Figure 3:
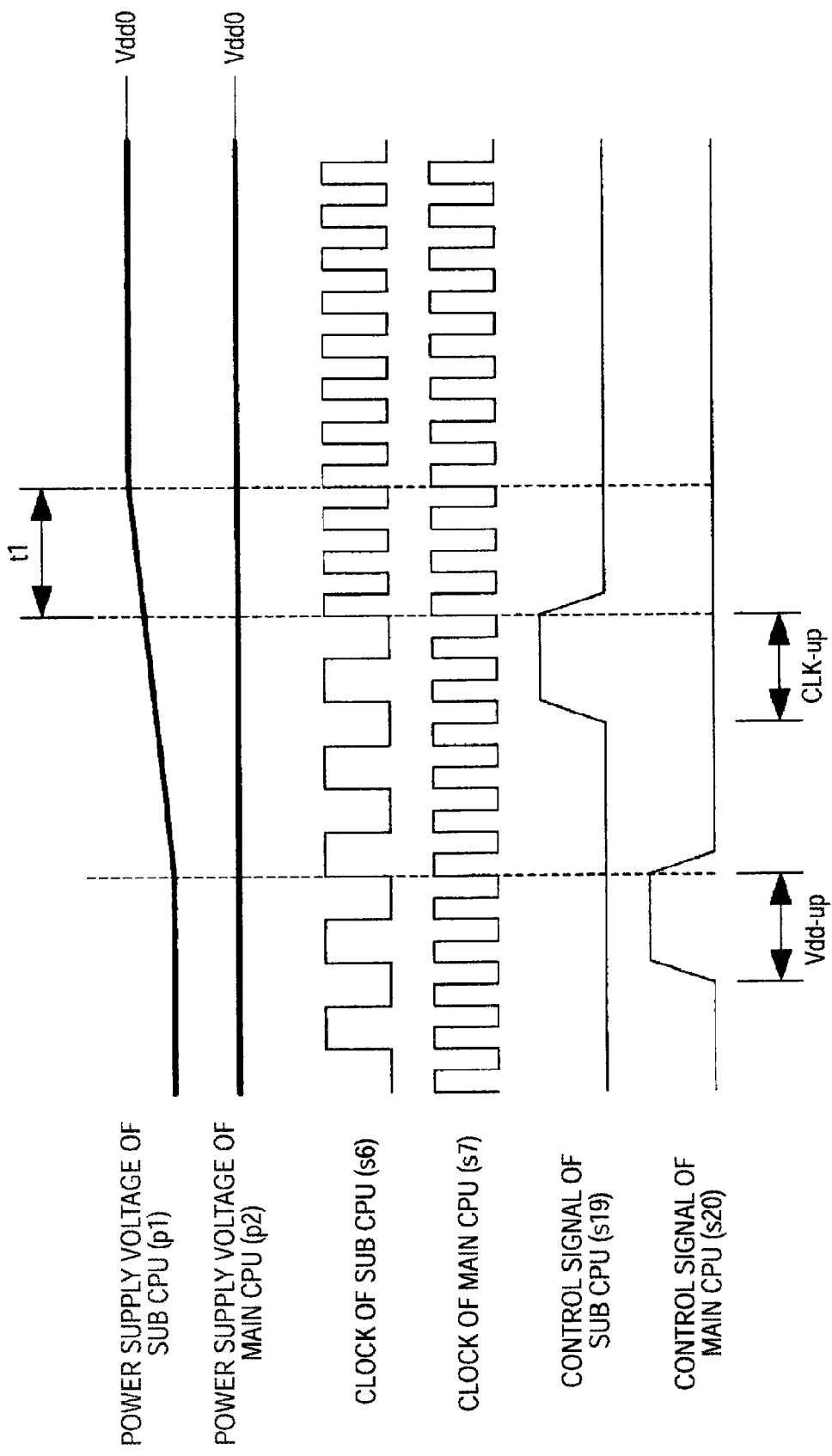
FIG. 3 is a waveform chart showing a power control sequence involving a malfunction in the system LSI shown in FIG. 1.

FIG. 3 is a waveform chart showing a power control sequence involving a malfunction in the system LSI shown in FIG. 1. Assume the case where the operating mode is shifted from the first operating mode to the second operating mode like FIG. 2. In the same manner as in FIG. 2, the main CPU 9 issues a control signal (Vdd-up) s20 to the power and clock control portion 36 to increase the power supply voltage p1, and the sub CPU 8 issues a control signal (CLK-up) s19 after passage of a specified time to increase the frequency of the clock s6.

However, when the leading edge of the power supply voltage p1 of the power domain to which the sub CPU 8 belongs is later than the leading edge shown in FIG. 2, the frequency of the clock s6 of the sub CPU 8 becomes high in a period t1 in which the power supply voltage p1 of the sub CPU 8 has not reached the assured voltage Vdd0.

Or, when the sub CPU 8 issues a control signal (CLK-up) s19 after passage of a shorter time than the specified time to increase the frequency of the clock s6, the frequency of the clock s6 of the sub CPU 8 becomes high in the period t1 in which the power supply voltage p1 of the sub CPU 8 has not reached the assured voltage Vdd0. For this reason, a malfunction occurs in the period t1 in which the sub CPU 8 operates at a low power supply voltage and at a high operating frequency.

It is therefore necessary to control the power sequence to prevent the malfunction as shown in FIG. 3.

[First Embodiment]

Figure 4:
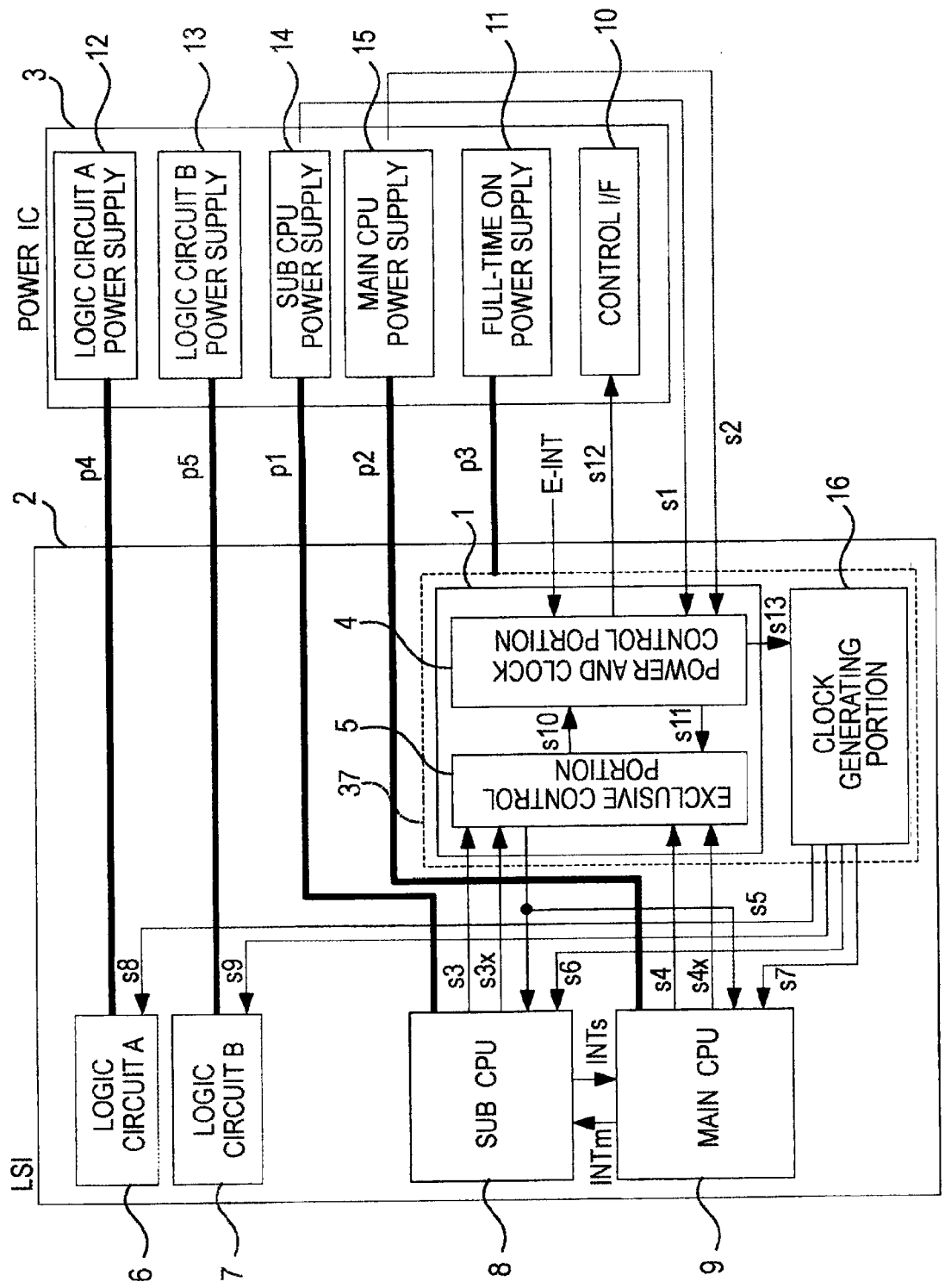
FIG. 4 is a configuration diagram of a system LSI having multiple CPUs according to a first embodiment of the invention.

FIG. 4 is a configuration diagram of a system LSI having multi-CPUs according to a first embodiment. Like FIG. 1, the system LSI 2 has a main CPU 9, a sub CPU 8, and logic circuits 6 and 7. The main CPU 9, the sub CPU 8, and the logic circuits 6 and 7 each belong to different power domains. Accordingly, reference numerals given to the power domains 6, 7, 8, and 9 are also given to the logic circuits 6 and 7 and the CPUs 8 and 9 respectively. The system LSI 2 further has a full-time ON power domain 37 that is always supplied with power. A power management unit (PMU) 1 and a clock generating portion 16 belong to the power domain 37. The power management unit 1 has a power and clock control portion 4 and an exclusive control portion 5. The power and clock control portion 4 controls power supply voltages p1 to p5 of power domains 8, 9, 37, 6, and 7, and controls clock frequencies s6 to s9 of the CPUs 8 and 9 and the logic circuits 6 and 7. The exclusive control portion 5 is provided between the power and clock control portion 4 and the two CPUs 8 and 9 and exclusively controls acceptance of control request signals s3 and s4 from the two CPUs 8 and 9. The exclusive control portion 5 may be built in the power and clock control portion 4.

The power IC 3 is configured in the same manner as in FIG. 1 except that the power IC 3 supplies power status signals s1 and s2 to the power and clock control portion 4. The power status signal s1 indicates the power supply voltage status of the sub CPU power supply portion 14. The power status signal s2 indicates the power supply voltage status of the main CPU power supply portion 15. The power and clock control portion 4 can detect completion of power supply voltage rise/drop based on the power status signals s1 and s2.

In this embodiment, the power and clock control portion 4 cooperates with the exclusive control portion 5 so that when a power change request is accepted from one CPU, a clock frequency change request is not accepted from the other CPU unless the power change is completed. In this case, the power change request and the clock frequency change request may be, for example, a request to increase the power supply voltage and a request to increase the clock frequency. Specifically, upon acceptance of a power change request from one CPU, the exclusive control portion 5 and the power and clock control portion 4 supply a power change control signal s12 to the control interface 10 of the power IC 3. The exclusive control portion 5 and the power and clock control portion 4 monitor a corresponding power status signal s1 or s2 so that a request is accepted from the other CPU only after the power supply voltage change is completed. Unless the power supply voltage change is completed, a request is not accepted from the other CPU.

Figure 5:
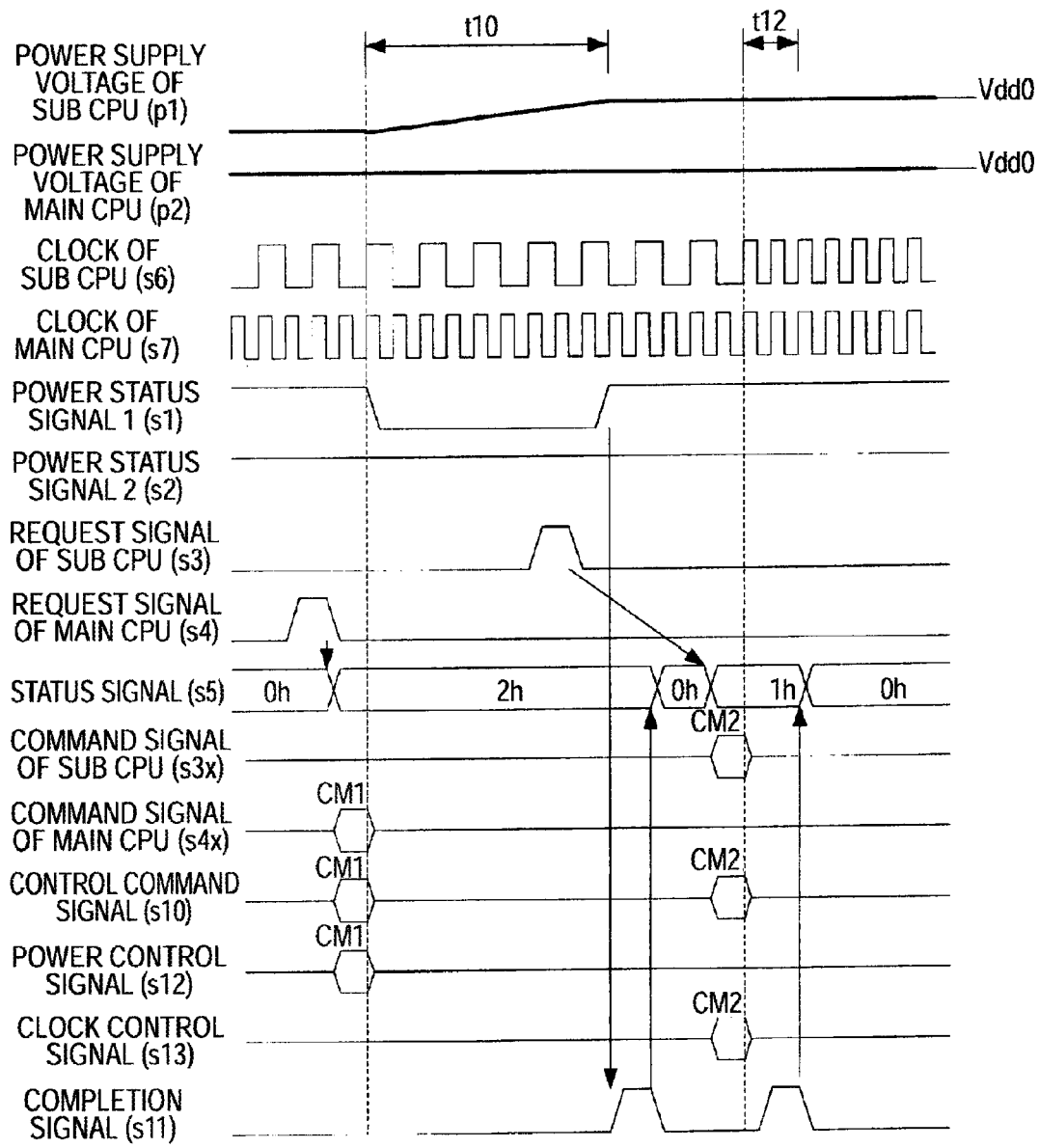
FIG. 5 is a waveform chart illustrating a power control sequence in the first embodiment.

FIG. 5 is a waveform chart showing a power control sequence in the first embodiment. Like FIGS. 2 and 3, in a first operating mode, the main CPU 9 performs a given process and the sub CPU 8 stands by. Assume now the case where the operating mode is shifted to a second operating mode in response to an occurrence of a certain event so that the main CPU 9 will make the sub CPU 8 execute a specific process.

The main CPU 9 monitors a status signal s5 which is output from the exclusive control portion 5 and which indicates whether request acceptance is enabled or not. When the main CPU 9 confirms that the status signal s5 indicates a state "0h" in which a request can be accepted from the main CPU 9, the main CPU 9 issues a request signal S4 to the exclusive control portion 5. In response to the request signal s4, the exclusive control portion 5 changes the status signal s5 to a state "2h" in which a request has been accepted from the main CPU 9. When the main CPU 9 confirms that the status signal s5 has been changed to "2h," the main CPU 9 issues a command CM1 as a command signal s4x to the exclusive control portion 5 to increase the power supply voltage of the sub CPU 8. In response to the command signal s4x, the exclusive control portion 5 issues the command CM1 as a control command signal s10 to the power and clock control portion 4. In response to the control command signal s10, the power and clock control portion 4 issues the command CM1 as a power control signal s12 to the control interface 10. As a result, the sub CPU power supply portion 14 in the power IC 3 increases the power supply voltage p1 of the sub CPU 8. Also in this case, a certain amount of time is required for increasing the power supply voltage by a voltage increasing operation because the power supply portion 14 is a voltage regulator and is a circuit for increasing the power supply voltage by a pumping operation. The time required for increasing the power supply voltage p1 also depends on a characteristic of the power domain 8.

The power and clock control portion 4 monitors a power status signal s1 of the sub CPU power supply portion 14. When the power and clock control portion 4 confirms that the power status signal s1 is equal to H indicating that the power supply voltage p1 has reached the assured voltage Vdd0, the power and clock control portion 4 outputs a completion signal s11 to the exclusive control portion 5. In response to the completion signal s11, the exclusive control portion 5 changes the status signal s5 to a request acceptable state "0h." In FIG. 5, the period t10 is a period required for increasing the power supply voltage p1. The exclusive control portion 5 does not accept any request from the sub CPU 8 during the period t10 in which the power supply voltage change is not completed.

The sub CPU 8 executes a specific process in response to an interrupt signal INTm from the main CPU 9. It is therefore necessary to increase the power supply voltage p1 to be higher and to increase the frequency of the clock s6 to be higher than that in the standby state. The main CPU 9 controls the power management unit 1 so that the power supply voltage p1 is controlled to be high. Then, the sub CPU 8 issues a request to the power management unit 1 to increase the frequency of the clock s6.

Specifically, the sub CPU 8 issues a request signal s3 and monitors whether the status signal of the exclusive control portion 5 indicates a request accepted state "1h." As described above, the exclusive control portion 5 does not change the status signal s5 to a request acceptable state "0h" and prohibits acceptance of the request signal s3 from the sub CPU 8 unless the completion signal s11 is received. When the power and clock control portion 4 confirms that the power status signal s1 is equal to H, which indicates that the power supply voltage p1 has reached the assured voltage Vdd0, the power and clock control portion 4 outputs a completion signal s11. The exclusive control portion 5 changes the status signal s5 to an acceptable state "0h." On this occasion, the request signal s3 from the sub CPU 8 can be accepted by the exclusive control portion 5. The exclusive control portion 5 changes the status signal s5 to a state "1h" in which the request has been accepted from the sub CPU 8. When the sub CPU 8 confirms the acceptance of its own request based on the status signal s5=1h, the sub CPU 8 issues a command CM2 as a command signal s3x to the exclusive control portion 5 to increase the clock frequency.

The exclusive control portion 5 validates the command CM2 and sends the command CM2 as a control command signal s10 to the power and clock control portion 4. The power and clock control portion 4 issues the command CM2 as a clock control signal s13 to the clock generating portion 16. In response to the clock control signal s13, the clock generating portion 16 increases the frequency of the clock s6 of the sub CPU 8. In FIG. 5, the period t12 is a period required for increasing the frequency of the clock s6. The clock generating portion 16 can increase the clock frequency in a shorter time than the time required for the power increasing operation.

Since increase of the clock frequency is completed in a short time, the power and clock control portion 4 outputs a completion signal s11 when a given time has passed after the issue of the command CM2. In response to the completion signal s11, the exclusive control portion 5 restores the status signal s5 to "0h." As a result, a request can be accepted from either one of the CPUs 8 or 9.

As described above, the power management unit 1 requests the power IC to change a power supply voltage in response to a power supply voltage change request from the main CPU 9. However, unless the power supply voltage change is completed, a clock frequency change request is not accepted from the sub CPU 8. However, a request is accepted from the sub CPU 8 immediately after the power supply voltage change is completed. Accordingly, the power management unit 1 according to the first embodiment can control a power supply voltage change and clock frequency change sequence in optimum timing in accordance with the device characteristics of the system LSI. Moreover, malfunctions caused by increases in the frequency of the clock s6 before increases in the power supply voltage p1 of the sub CPU 8 to the assured voltage Vdd0 may be avoided.

When processing (such as image processing) by the logic circuit 7 is required for the sub CPU 8 to execute a specific process in the second operating mode, the sub CPU 8 requests, via the power management unit 1, an increase the power supply voltage p5 and an increase in the frequency of the clock s9 of the logic circuit 7.

[Second Embodiment]

Figure 6:
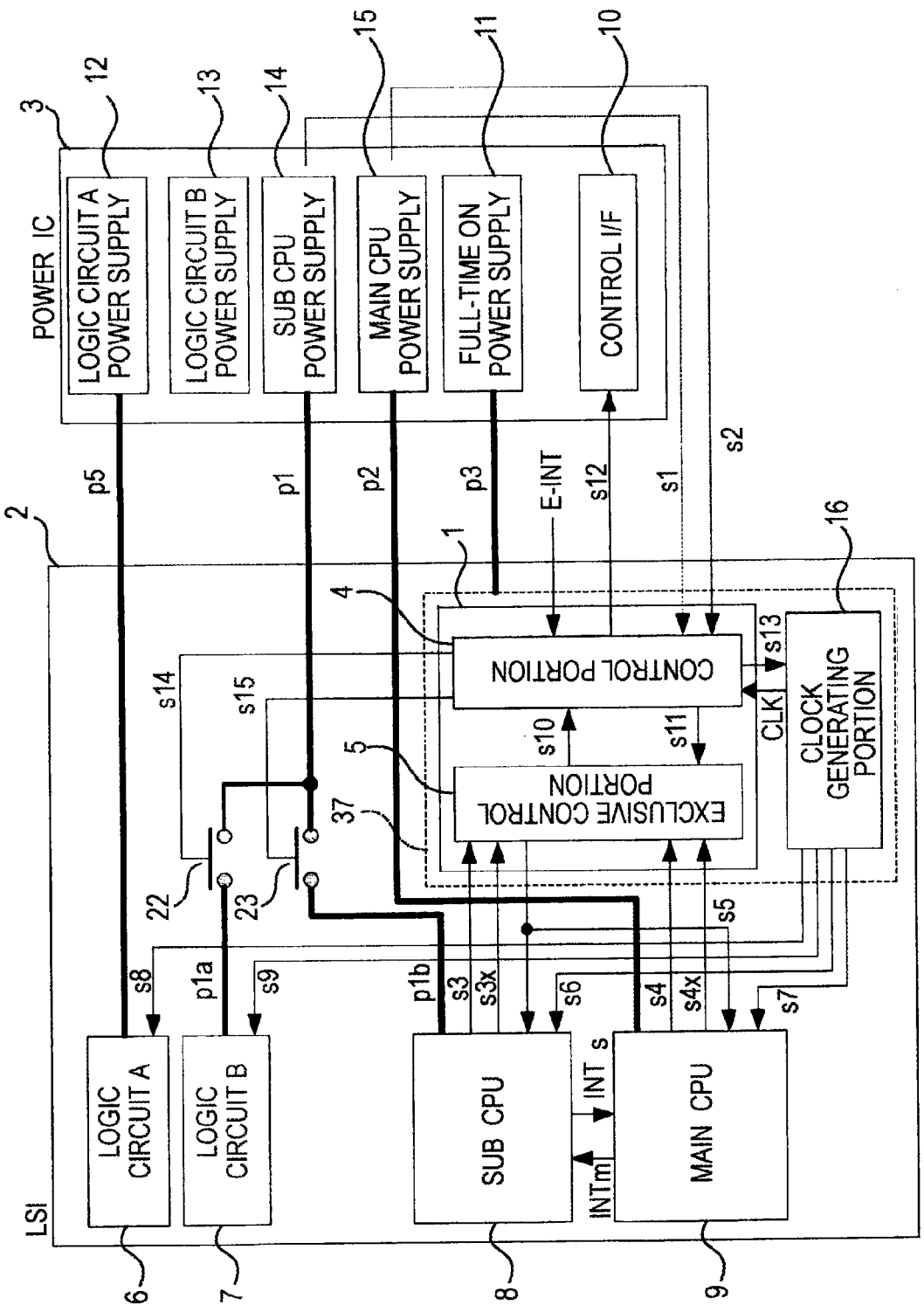
FIG. 6 is a configuration diagram of a system LSI having multi CPUs according to a second embodiment of the invention.

FIG. 6 is a configuration diagram of a system LSI having multi-CPUs according to a second embodiment. In the second embodiment, power switches 22 and 23 are provided between the sub CPU power supply portion 14 and the logic circuit 7 and between the sub CPU power supply portion 14 and the sub CPU 8, respectively. The sub CPU power supply portion 14 supplies the power supply voltage p1 to the power domains of the logic circuit 7 and the sub CPU 8 through the power switches 22 and 23. The provision of the power switches 22 and 23 makes it possible to cut off the power supply voltage p1 both to the inactive logic circuit 7 and to the inactive sub CPU 8 to thereby eliminate power consumption due to the leak current in the circuits.

Also in the second embodiment, like the first embodiment, the power management unit 1 has an exclusive control portion 5 and a power and clock control portion 4. The power and clock control portion 4 monitors power status signals s1 and s2 of the power IC after the power and clock control portion 4 issues a command as a power control signal s12 to change the power supply voltage p1 or p2. The power and clock control portion 4 outputs a completion signal s11 to the exclusive control portion 5 in response to s1=H or s2=H indicating completion of the power supply voltage change.

Figure 7:
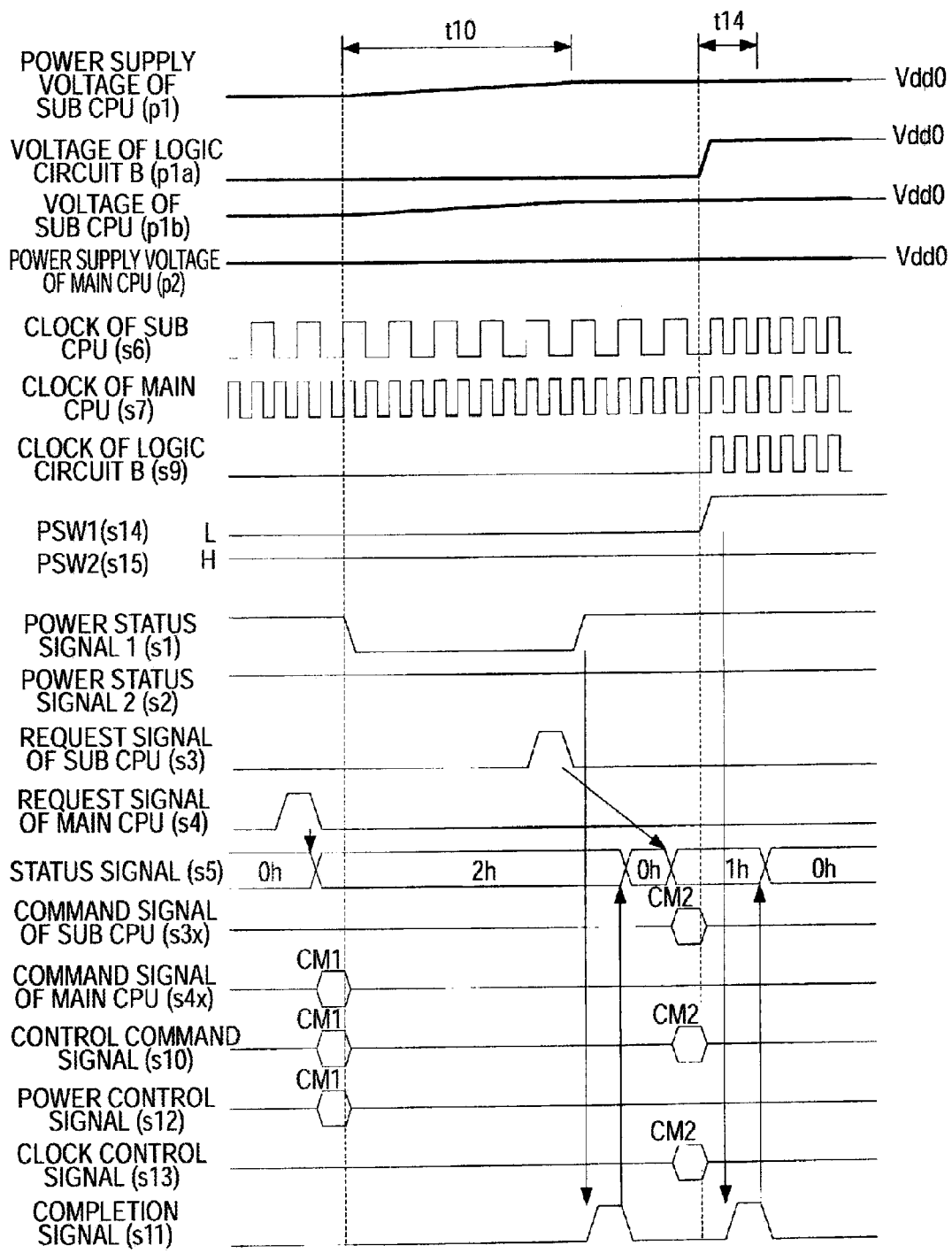
FIG. 7 is a waveform chart showing a power control sequence in the second embodiment.

FIG. 7 is a waveform chart showing a power control sequence in the second embodiment. In an initial state, the power switch 23 for the sub CPU 8 is ON (s15=H) whereas the power switch 22 for the logic circuit 7 is OFF (s14=L). The power supply voltage p1 is supplied as a power supply voltage p1b to the power domain of the sub CPU 8 but is not supplied as a power supply voltage p1a to the power domain of the logic circuit 7. That is, the sub CPU 8 is active but the logic circuit 7 is inactive.

Assuming the case where the operating mode is shifted from the first operating mode to the second operating mode in the same manner as in the first embodiment, then the main CPU 9 confirms that the status signal s5 is in a request acceptable state "0h," and outputs a request signal s4 to the exclusive control portion 5. In response to the request signal s4, the exclusive control portion 5 outputs a status signal s5=2h indicating that the request has been accepted. In response to the status signal s5=2h, the main CPU 9 outputs a command CM1 as a command signal s4x to the exclusive control portion 5 to increase the power supply voltage p1. The sequence for increasing the power supply voltage p1 after that is the same as in the first embodiment.

In response to the command CM1 as a request to increase the power supply voltage p1, the sub CPU power supply portion 14 of the power IC 3 increases the power supply voltage p1. As a result, the power supply voltage p1b for the sub CPU 8 rises in the period t10 through the power switch 23 which is ON. The exclusive control portion 5 does not accept any request signal s3 from the sub CPU 8 unless the power supply voltage p1 reaches the assured voltage Vdd0.

When the power supply voltage p1 reaches the assured voltage Vdd0, the power status signal s1 becomes H and the control portion 4 outputs a completion signal s11. As a result, the exclusive control portion 5 changes the status signal s5 to 0h and accepts a request signal s3 from the sub CPU 8. Also, the exclusive control portion 5 receives a command CM2 as a command signal s3x from the sub CPU 8 to increase the frequency of the clock s6, transfers the command CM2 to the control portion 4, and changes the status signal s5 to 1h. The command CM2 includes a request to turn ON the power and clock of the logic circuit 7.

The control portion 4 outputs the command CM2 as a clock control signal s13 to the clock generating portion 16. At the same time, the control portion 4 turns ON the power switch 22 based on the control signal s14=H to increase the power supply voltage p1a of the logic circuit 7. Since the power supply voltage p1 generated by the sub CPU power supply portion 14 has already reached the assured voltage Vdd0, the power supply voltage p1a of the logic circuit 7 rises to the assured level in a short time through the power switch 22 which is ON. At the same time, the clock generating portion 16 starts supply of the clock s9 to the logic circuit 7 while increasing the frequency of the clock s6 of the sub CPU 8 in response to the command CM2. The clock s9 is a high-speed clock like the clock s6. Turning ON the switch 22, changing the frequency of the clock s6, and starting the supply of the clock s9 are performed in the short time of the period t14 in FIG. 7.

After the control portion 4 performs processing corresponding to the command CM2, the control portion 4 outputs a completion signal s11 to the exclusive control portion 5. The exclusive control portion 5 changes the status signal s5 to "0h." As a result, a request can be accepted from each of the CPUs.

In the second embodiment, power switches 23 and 22 are provided for the power supply voltages p1b and p1a of the sub CPU 8 and the logic circuit 7, respectively. When the sub CPU 8 or the logic circuit 7 becomes inactive, the power switch 23 or 22 is turned OFF to eliminate power consumption due to the leak current in the sub CPU 8 or the logic circuit 7. Since the logic circuit 7 is inactive in the first operating mode, the power switch 22 is turned OFF and the clock s9 is stopped. On the other hand, since the sub CPU 8 is active, the power switch 23 is turned ON and the clock s6 is supplied at a low frequency. The main CPU 9 requests the sub CPU 8 to execute a specific process by an interrupt signal INTm. At the same time, the main CPU 9 issues a command to increase the power supply voltage p1. Then, the sub CPU 8 requests the exclusive control portion 5 by a command CM2 to increase the frequency of its own clock s6, turn ON the power switch 22 of the logic circuit 7 necessary for the specific process, and start the supply of the clock s9 to the logic circuit 7. In this case, the sub CPU power supply portion 14 made up of a voltage regulator has completed the operation of increasing the power supply voltage p1 in the period t14. Accordingly, if the power switch 22 is turned ON, the power supply voltage p1a of the logic circuit 7 rises in a short time. Accordingly, both turning ON the power switch 22 of the logic circuit 7 and starting the supply of the clock s9 to the logic circuit 7 may be performed in the period t14.

[Third Embodiment]

Figure 8:
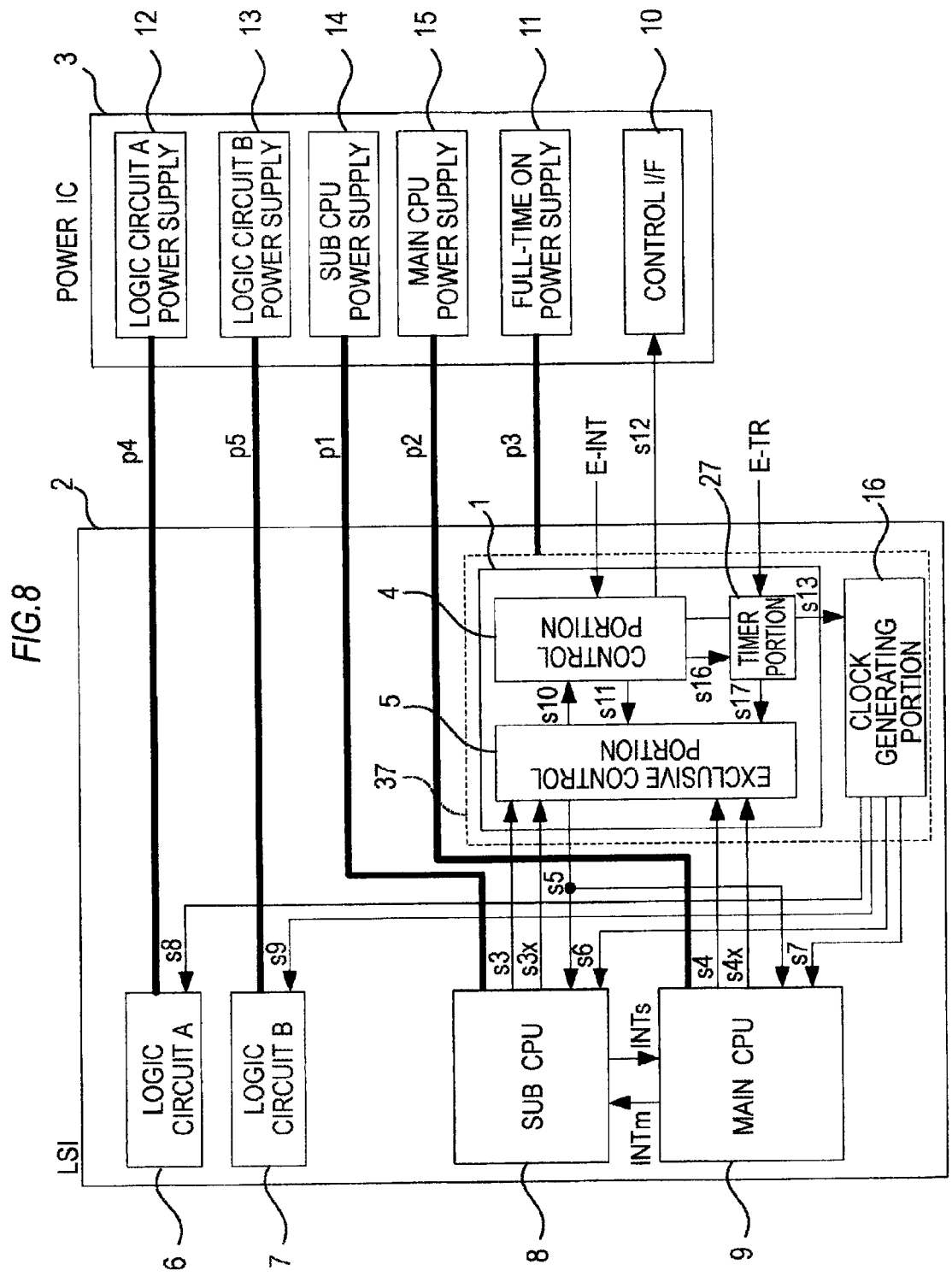
FIG. 8 is a configuration diagram of a system LSI having multi CPUs according to a third embodiment of the invention.

FIG. 8 is a configuration diagram of a system LSI having multi-CPUs according to a third embodiment. In the third embodiment, the power management unit 1 in the system LSI 2 has a timer portion 27 in addition to the exclusive control portion 5 and the power and clock control portion 4. The timer portion 27 counts a reference clock CLK. The exclusive control portion 5 changes the status signal s5 to "0h" in accordance with a completion signal s11 from the control portion 4 and a count completion signal s17 from the timer portion 27. The power and clock control portion 4 does not monitor the power status signal from the power IC 3 but changes the status signal s5 to a request acceptable state (s5=0h) in response to the completion of a customized time counting operation performed by the timer portion 27. Configuration is made so that the count time or count number of the timer portion 27 can be set by a control signal (not shown) from an external trimming signal E-TR or the CPU 9 to be an optimum time or count number. Other configurations of the system LSI 2 and the power IC 3 are the same as in the first embodiment.

Figure 9:
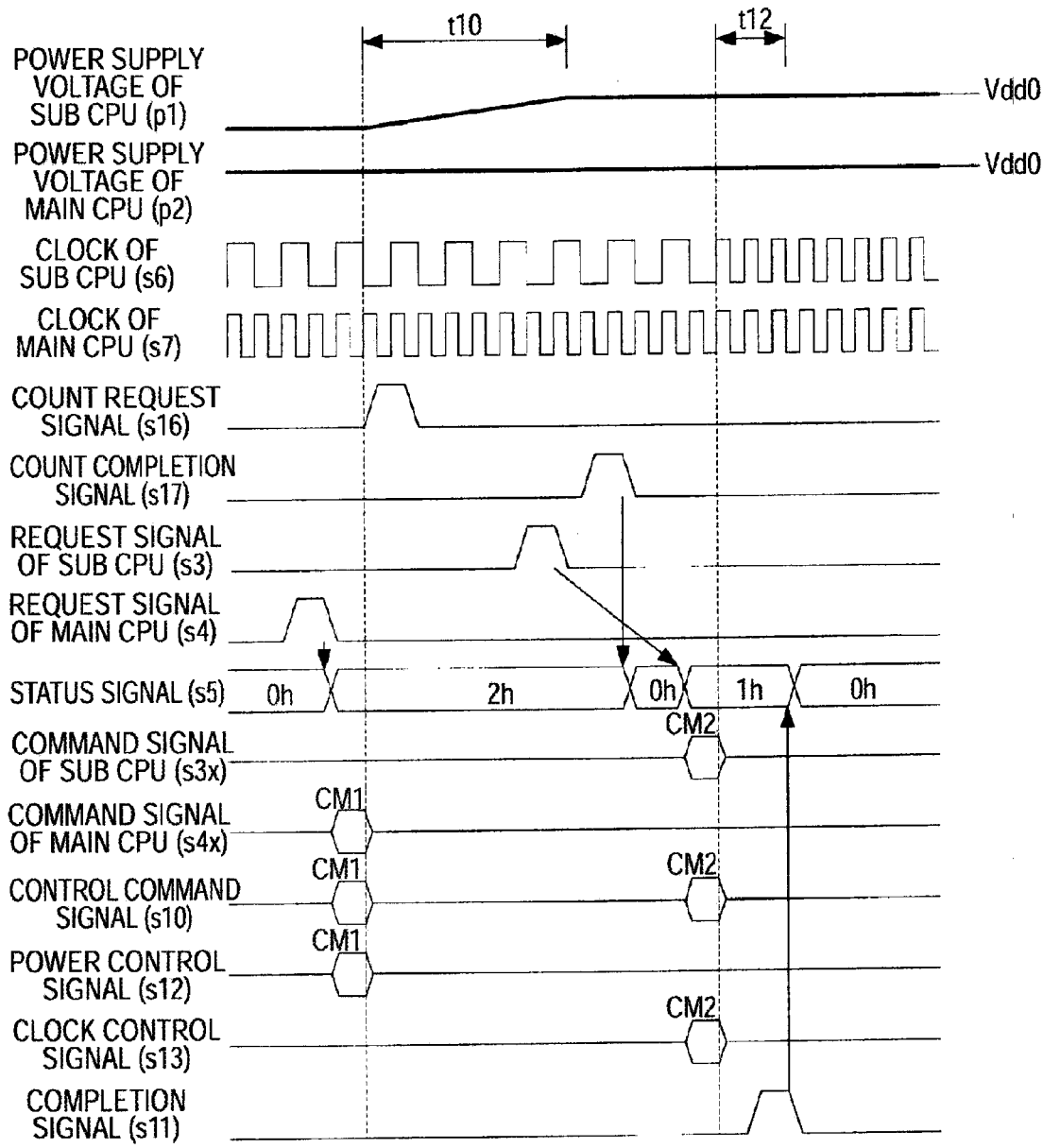
FIG. 9 is a waveform chart showing a power control sequence in the third embodiment.

FIG. 9 is a waveform chart showing a power control sequence in the third embodiment. Description will be made on the assumption that the operating mode is shifted from the first operating mode to the second operating mode as described above. In the same manner as in the first embodiment, when the main CPU 9 outputs a request signal s4 while the status signal s5 is in a request acceptable state "0h," the exclusive control portion 5 accepts the request and changes the status signal s5 to "2h." As a result, acceptance of another request is prohibited. In response to the status signal s5=2h, the main CPU 9 outputs a command CM1 as a command signal s4x to increase the power supply voltage p1. The exclusive control portion 5 and the control portion 4 output the command CM1 as a control command signal s10 and a power control signal s12, respectively. In response to the power control signal s12, the control interface 10 controls the sub CPU power supply portion 14 to increase the power supply voltage p1. As a result, the power supply voltage p1 rises to the assured voltage Vdd0 in the period t10.

At the same time, the control portion 4 outputs a count request signal s16 to the timer portion 27. The timer portion 27 starts the counting of the reference clock CLK. After the counting reaches a certain number, the timer portion 27 outputs a count completion signal s17 to the exclusive control portion 5. The count number corresponds to the time required for increasing the power supply voltage p1. The count number is specific to the power domain 8 in the system LSI 2. In response to the count completion signal s17, the exclusive control portion 5 restores the status signal s5 to "0h."

A request signal s3 from the sub CPU 8 is accepted by the exclusive control portions based on the status signal s5=0h. The exclusive control portion 5 changes the status signal s5 to "1h." As a result, acceptance of another request is prohibited. After the sub CPU 8 confirms the acceptance of its own request based on the status signal s5=1h, the sub CPU 8 outputs a command CM2 as a command signal s3x to the exclusive control portion 5 to increase the frequency of the clock s6. This command CM2 is transferred to the control portion 4. The control portion 4 transfers the command CM2 as a clock control signal s13 to the clock generating portion 16. In response to the clock control signal s13, the clock generating portion 16 increases the frequency of the clock s6. In FIG. 9, the frequency of the clock s6 rises in the period t12. When a given time for the period t12 has passed after the clock frequency increase request was issued, the control portion 4 outputs a completion signal s11 to the exclusive control portion 5. As a result, the status signal s5 is changed to a request acceptable state "0h."

As described above in the third embodiment, the timer portion 27 is provided and the count number or timer time of the timer portion 27 is set in advance at a value preferable for the system LSI 2. As a result, malfunctions can be prevented from being caused by increases in the frequency of the clock s6 before increases in the power supply voltage p1 of the sub CPU 8 to the assured voltage Vdd0. Moreover, since the count value of the timer portion 27 is optimized, a control sequence for increasing the power supply voltage and increasing the clock frequency can be performed in a short time.

[Fourth Embodiment]

Figure 10:
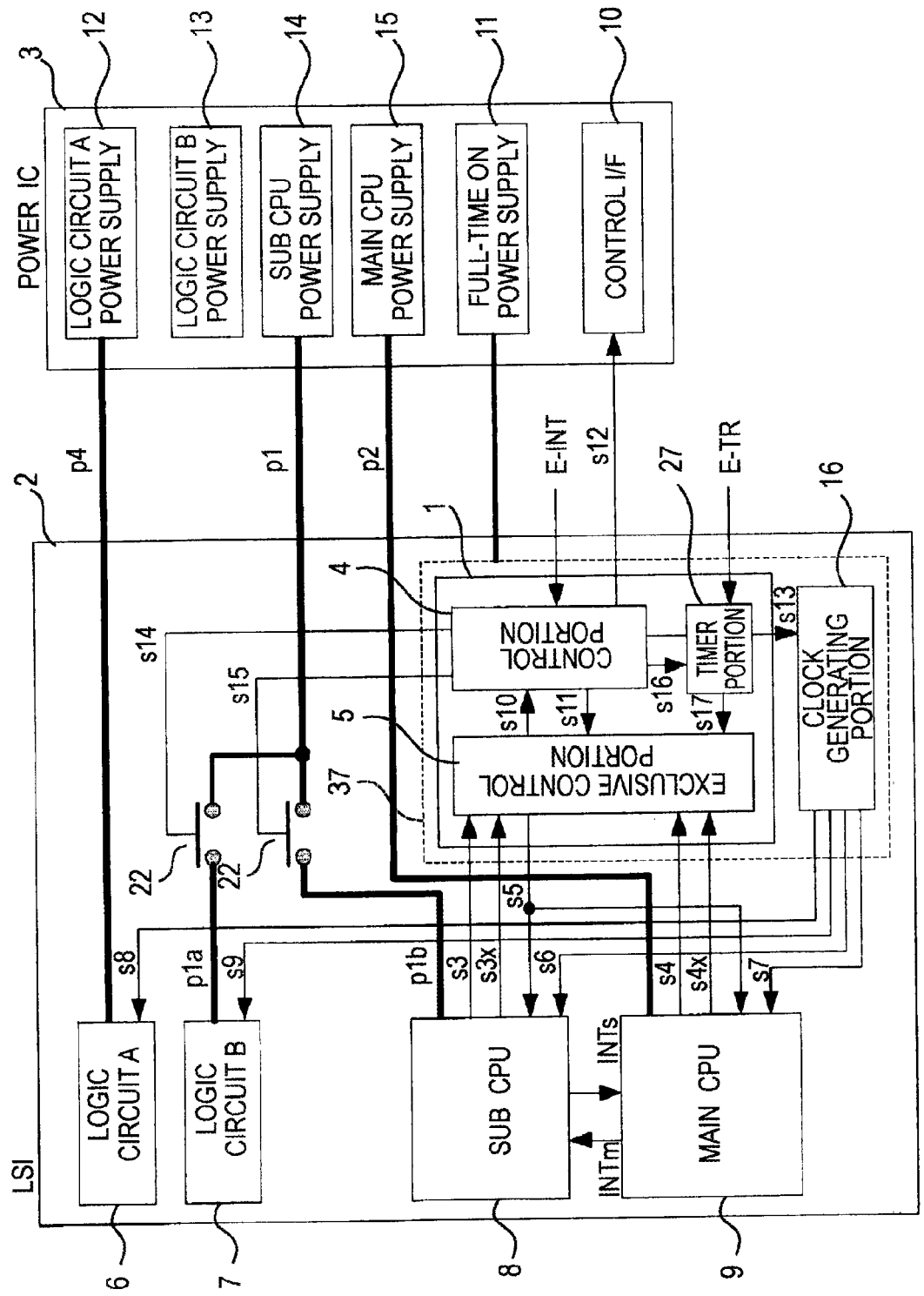
FIG. 10 is a configuration diagram of a system LSI having multi CPUs according to a fourth embodiment of the invention.

FIG. 10 is a configuration diagram of a system LSI having multi-CPUs according to a fourth embodiment. The fourth embodiment is such that the timer portion 27 in the third embodiment is applied to the second embodiment. Accordingly, the system LSI 2 according to the fourth embodiment has power switches 22 and 23 in the same manner as in the second embodiment. The control portion 4 controls ON/OFF of the power switches 22 and 23 based on power switch control signals s14 and s15. The power supply voltage p1 generated by the sub CPU power supply portion 14 is supplied to the logic circuit 7 and the sub CPU 8 through the power switches 22 and 23, respectively. The timer portion 27 is provided in the power management unit 1. Also, the power IC 3 does not output any power status signal.

Figure 11:
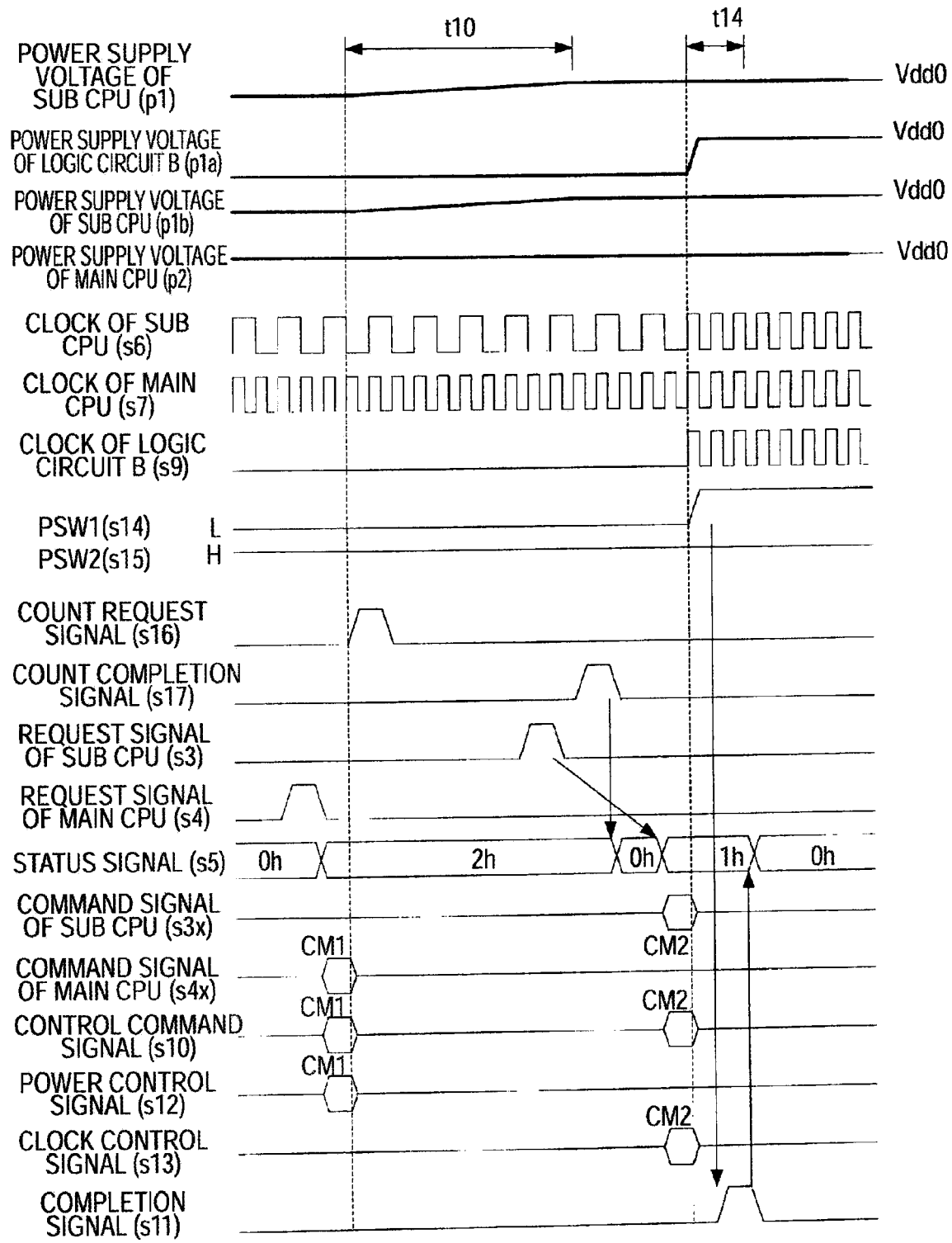
FIG. 11 is a waveform chart showing a power control sequence in the fourth embodiment.

FIG. 11 is a waveform chart showing a power control sequence in the fourth embodiment. The initial states of the power supply voltages p1a and p1b and the clock s9 are the same as the initial states in FIG. 7. The request signal s4, the command s4x, the status signal s5, of the main CPU 9 are the same as in FIG. 9. The control portion 4 requests the power IC 3 by a power control signal s12 to increase the power supply voltage p1 and outputs a count request signal s16 to the timer portion 27. As a result, the power supply voltage p1 rises in the period t10. A count number or timer time optimized for the power domain 8 is set in the timer portion 27 in the same manner as in the third embodiment. The timer portion 27 starts counting in response to the count request signal s16. When counting is completed, the timer portion 27 outputs a count completion signal s17 to the exclusive control portion 5. The exclusive control portion 5 changes the status signal s5 to "0h."

As a result, the exclusive control portion 5 accepts a request signal s3 from the sub CPU 8 and changes the status signal s5 to "1h" to prohibit acceptance of another request from the main CPU 9. Then, the sub CPU 8 outputs a command CM2 that includes a request to increase the frequency of the clock s6, a request to turn ON the power switch 22, and a request to start the supply of the clock s9. The power management unit 1 performs control in accordance with the command CM2. The control is the same as in the second embodiment. When the control portion 4 outputs a completion signal s11 after the completion of the control, the exclusive control portion 5 changes the status signal s5 to a request acceptable state "0h." Increasing the frequency of the clock s6, issuing a request to turn ON the power switch 22, and starting the supply of the clock s9 are performed in the period t14.

When the power supply voltage of a power domain is to be decreased and the clock frequency of a circuit belonging to the power domain is to be decreased, it is preferable that first the clock frequency is decreased and then the power supply voltage is decreased.

As described above, in accordance with the first to fourth embodiments, the power management unit 1 can accept power supply voltage change requests and individual clock frequency change requests from the CPUs to thereby avoid malfunctions caused by changes in the clock frequency before completion of changes in the power supply voltage.

In the embodiments, the clock generating portion 16 built in the system LSI 2 may be provided as an external IC. Conversely, the external power IC 3 may be built in the system LSI 2. The power management unit 1 may be provided as an external IC. All the power supply voltages generated by the power IC 3 may be supplied to the power domains 6, 7, 8, 9, and 37 through power switches.

What is claimed is:

1. A power management unit for controlling power supply voltages of first and second power domains to which first and second CPUs belong respectively, the power management unit comprising:
   a power IC which supplies first and second power supply voltages to the first and second power domains respectively;
   a clock generating portion which generates first and second clocks and supplies the first and second clocks to the first and second CPUs respectively; and
   a power and clock control portion which is connected both to the power IC and to the clock generating portion, wherein:
   the power and clock control portion controls the power IC to change the second power supply voltage in response to a power supply voltage change request for the second power domain from the first CPU and controls the clock generating portion to change the frequency of the second clock in response to a frequency change request for the second clock from the second CPU; and
   the power and clock control portion prohibits acceptance of the second clock frequency change request in response to the second power domain power supply voltage change request unless the second power supply voltage reaches a voltage level in accordance with the power supply voltage change request.

2. A power management unit according to claim 1, wherein the power and clock control portion monitors a second power supply voltage status signal indicating the status of the second power supply voltage supplied from the power IC and detects a period required for the second power supply voltage reaching the voltage level based on the second power supply voltage status signal.

3. A power management unit according to claim 1, wherein the power and clock control portion has a timer portion and detects the period required for the second power supply voltage reaching the voltage level based on a timer count completion signal indicating completion of a timer count started by the timer portion in response to the second power supply voltage change request so that the timer count time of the timer portion is customized in accordance with each power domain.

4. A power management unit according to claim 1, wherein the power and clock control portion has an exclusive control portion which outputs a status signal indicating a request acceptable state of a request from the first or second CPU to the first or second CPU and keeps the status signal in a request unacceptable state during a period from the acceptance of a request from one of the first and second CPUs to the completion of a changing operation in accordance with the request to thereby prohibit acceptance of any request from the other CPU.

5. A system LSI supplied with power supply voltages from a power IC and supplied with clocks from a clock generating portion, the system LSI comprising:
   first and second CPUs which belong to first and second power domains respectively; and
   a power management unit which controls first and second power supply voltages of the first and second power domains; wherein:
   the power management unit controls the power IC to change the second power supply voltage in response to a power supply voltage change request of the second power domain from the first CPU, and controls the clock generating portion to change the frequency of a second clock in response to a second clock frequency change request from the second CPU; and
   the power management unit further prohibits acceptance of the second clock frequency change request in response to the power supply voltage change request of the second power domain during a period required for the second power supply voltage to reach a voltage level in accordance with the power supply voltage change request.

6. A system LSI according to claim 5, wherein the power management unit monitors a second power supply voltage status signal indicating the status of the second power supply voltage supplied from the power IC and detects the period required for the second power supply voltage reaching the voltage level based on the second power supply voltage status signal.

7. A system LSI according to claim 5, wherein the power management unit has a timer portion and detects the period required for the second power supply voltage to reach the voltage level based on a timer count completion signal indicating completion of a timer count started by the timer portion in response to the second power supply voltage change request so that the timer count time of the timer portion is customized in accordance with each power domain.

8. A system LSI according to claim 5, wherein the power management unit has an exclusive control portion which outputs a status signal indicating a request acceptable state of a request from the first or second CPU to the first or second CPU and keeps the status signal in a request unacceptable state during a period from the acceptance of a request from one of the first and second CPUs to the completion of a changing operation in accordance with the request to thereby prohibit acceptance of any request from the other CPU.

9. A system LSI according to claim 5, wherein the power management unit belongs to a full-time ON power domain.

10. A system LSI according to claim 5, further comprising:
    a logic circuit which belongs to a third power domain;
    a first power switch which is provided between the second power domain to which the second CPU belongs and the second power supply voltage; and
    a second power switch which is provided between the third power domain to which the logic circuit belongs and the second power supply voltage; wherein the power management unit controls the power IC to change the second power supply voltage while keeping the first power switch ON in response to the second power supply voltage change request and controls the second power switch to turn ON in response to the second clock frequency change request to thereby make the clock generating portion start supply of a third clock to the logic circuit.

11. A system LSI according to claim 5, wherein when the logic circuit is inactive, the power management unit controls the first power switch by turning the first power switch OFF to thereby stop the supply of the third clock from the clock generating portion.

12. A system LSI according to claim 5, wherein the first and second CPUs supply interrupt signals to each other.

* * * * *